Figure 1:
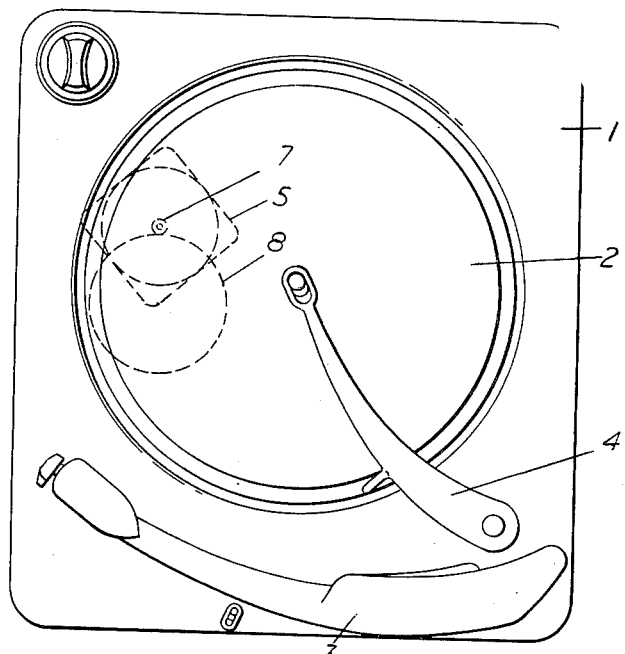

Aug. 7, 1962     E. T. HUMBY     3,048,429

DRIVING MECHANISMS FOR SOUND REPRODUCING APPARATUS

Filed July 1, 1960

Inventor
E. T. Humby
By
Holcomb, Wetherill & Brisebois
Attorneys

United States Patent Office 3,048,429
Patented Aug. 7, 1962

3,048,429
DRIVING MECHANISMS FOR SOUND
REPRODUCING APPARATUS
Edward Thomas Humby, Hornchurch, England, assignor
to Collaro Limited
Filed July 1, 1960, Ser. No. 40,316
Claims priority, application Great Britain Aug. 6, 1959
6 Claims. (Cl. 287—52.08)

In one quite common form of driving mechanism for sound reproducing apparatus, for example gramophones and tape recorders, a constant speed electric motor has a driving pulley fixed on its shaft. The pulley has a number of steps of different diameters to enable the apparatus to be driven at any one of a number of different speeds. For example, the turntable of a gramophone may be rotated at speeds of 16, 33, 45 or 78 revolutions per minute.

The driving pulley drives the turntable of a gramophone or any other rotary part of a sound reproducing apparatus either by means of an idler wheel which bears against one of the steps of the pulley and against the turntable or other rotary part, or by means of a driving belt which passes around one of the steps of the pulley and around another pulley fixed to the turntable or other rotary part.

A change-speed device is provided for altering the position of the belt or of the idler wheel from one step on the pulley to another. The usual method of fixing the driving pulley on the shaft of the electric motor is by providing a socket in the pulley within which the end of the shaft fits.

The speed at which a gramophone turntable or a spool holder of a tape recorder is rotated is extremely critical and must be maintained constant within very close limits. If the speed is not maintained constant in a gramophone, sound distortions which are known as "wow" or "flutter" are produced.

To ensure that the driving pulley is accurately centred on the driving shaft and so to prevent variations in the speed at which the pulley rotates the idler wheel or belt, the shaft must be a very close fit indeed within the socket. In general, in gramophone driving motors a tolerance in the diameter of the shaft and in the diameter of the socket of only .0005 of an inch is permissible. Because the shaft is such a close fit in the socket difficulties arise in clamping the shaft in position. If an ordinary grub screw is used which passes through a tapped bore in the pulley and bites into the part of the shaft within the socket, the shaft itself becomes distorted because some of the metal is displaced where the grub screw bites into it, and because of the very small clearance between the shaft and the socket it is then impossible to remove the pulley again. This is very undesirable because frequently the pulley must be exchanged for a pulley of slightly different diameter to allow for slight variations in the speed at which the motor runs due to friction in its bearings and other causes. The pulley may, therefore, have to be changed during the course of the works tests which are carried out on the driving mechanism before it leaves the factory. If, on the other hand, the shaft is of very hard steel, a grub screw will not obtain a satisfactory grip and there is a tendency for the pulley to work loose and fall off in use.

The object of the present invention is to provide a means of fixing the pulley firmly in position on a hardened steel or other shaft in such a way that it is accurately centred and so will drive the turntable or other rotary member at an accurate constant speed, but in such a way that it can also be removed if necessary.

According to the present invention, in sound reproducing apparatus having a constant speed electric driving motor which has a driving pulley having a number of steps with different diameters fixed on its shaft, the shaft is a close fit in a central socket in the pulley and the pulley has a tapped blind bore, the blind end of which is adjacent the wall of the socket, the pulley being held on the shaft by a grub screw which is screwed tightly into the bore and presses a hard ball into the blind end of the bore so that a part of the wall of the socket is pressed inwards to grip the motor shaft.

With this arrangement the part of the wall of the socket which is forced inwards is elastically deformed and, when the grub screw is loosened, the wall of the socket is restored to its original shape, or very nearly to its original shape, so that the driving pulley can easily be removed from the motor shaft. The part of the wall of the socket which is deformed and forced inwards extends over a far greater area than does the point of the grub screw which was previously used for fixing the pulley on the motor shafts, and because of this great area of contact between the socket and the motor shaft there is no tendency for the motor shaft itself to be damaged.

The inner end of the grub screw is preferably formed with a part spherical cup which fits closely against a part of the ball. With this arrangement, the ball is supported over a substantial part of its surface area so that it is not permanently damaged when the grub screw is tightened. The ball may be a hardened steel ball bearing.

The axis of the blind bore may be at right angles to the axis of rotation of the pulley, which is of course coaxial with the axis of the shaft, but preferably the angle included between the axis of the bore and the axis of the shaft between its intersection with the axis of the bore and the free end of the shaft, is acute; that is to say the axis of the blind bore is inclined outwards towards the free end of the shaft. This improves the accessibility of the grub screw, which is a considerable advantage in gramophones and in tape recorders which are necessarily housed in a small space and are therefore difficult to get at for repair purposes. The blind end of the bore may be conical so that it has a circular line contact with the ball.

Figure 2:
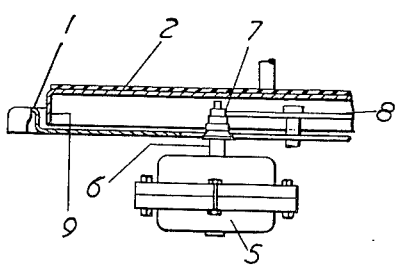

An example of a gramophone constructed in accordance with the invention is illustrated in the accompanying drawings in which:

FIGURE 1 is a plan;
FIGURE 2 is an elevation of a part of the gramophone shown in FIGURE 1 with part of the base plate and turntable cut away to show the driving mechanism; and
FIGURE 3 is a partly sectional elevation to a larger scale of a part of the motor shaft and the driving pulley fixed on it.

As shown in FIGURE 1 of the drawings, the gramophone has a base plate 1 on which a turntable 2, a pickup arm 3 and a balance arm 4, are mounted. A driving motor 5 is fixed to the underside of the base plate 1 and has a driving shaft 6 which projects upwards through the base plate 1 below the turntable 2. A driving pulley 7 is fixed on the upper end of the shaft 6 and when the gramophone is in operation a rubber idler wheel 8 is held in engagement with the pulley 7 and with the inside surface of the rim 9 of the turntable so that the drive is transmitted from the pulley 7 to the turntable 2.

Figure 3:
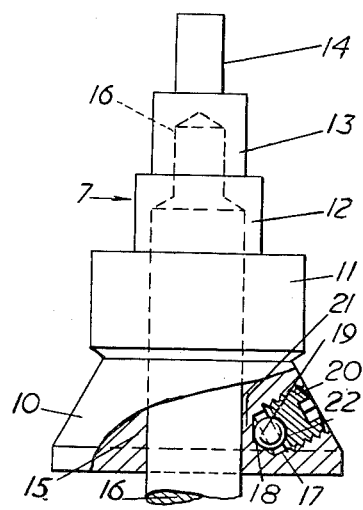

As shown in FIGURE 3 of the drawings, the driving pulley has a frusto conical base 10 on top of which are four steps 11, 12, 13 and 14. The steps 11 to 14 are, as can be seen, of progressively decreasing diameters and these diameters are such that when the shaft 6 is rotated at a predetermined constant speed, the turntable is rotated at a speed of 78 revolutions per minute when the idler wheel 8 is in engagement with the step 11; 45 revolutions per minute when in engagement with the step 12; 33 revolutions per minute when in engagement with the step 13 and 16 revolutions per minute when in engagement with the step 14. The idler wheel 8 has a circular central socket 15 having at its upper end a portion of reduced diameter 16. The shaft 6 is a close fit within the lower portion of the socket 15. By a close fit is meant that there is a tolerance in the diameter of the shaft and in the diameter of the socket of .0005 of an inch. The maximum clearance across the diameter of the socket is .001 of an inch. In practice, this tolerance is preferably reduced to .0002 of an inch, as also is the tolerance in the diameter of the shaft.

The base 10 is provided with a blind bore 17 having a conical end 18. The blind bore contains a hardened steel ball bearing 19 and a grub screw 20. There is a thickness of metal of approximately $\frac{1}{50}$ of an inch between the end of the blind bore 17 and the wall of the socket 15 at 21.

When the pulley 7 is assembled on the shaft, the shaft 6 is inserted in the socket 15 whilst the grub screw 20 is loose; that is to say, whilst it exerts no pressure on the ball bearing 19. The grub screw 20 is then tightened so that a part spherical socket 22 in its end surface is pressed against the ball bearing 19 and the ball bearing 19 is in consequence pressed against the conical end 18 of the bore 17. This tightening of the grub screw 20 causes the portion 21 of the wall of the socket 15 to be elastically distorted inwards so that the shaft 6 is tightly gripped within the socket 15.

If for any reason it is desired to change the pulley 7 on the shaft 6, the grub screw 20 is loosened, whereupon the portion 21 of the wall of the socket 15 returns to its original shape and the pulley 7 can be freely removed.

The axis of the bore 17 is at right angles to the conical surface of the base part 10. The angle of conicity of the base part 10 is 30 degrees and thus the angle included between the axis of the bore 17 and the axis of the shaft 6 between their intersection and the free end of the shaft 6, is 60 degrees.

I claim:
1. In sound reproducing apparatus including a constant speed electric driving motor, a driving shaft forming part of said motor, a stepped driving pulley having an internal annular wall defining a central socket in said pulley, said shaft having a close fit in said socket, the improved means for holding said shaft in said socket which comprises a screw-threaded blind bore in said pulley, the blind end of said bore being adjacent said wall, a hard ball in the blind end of said bore and a screw screwed tightly into said bore and pressing said ball against said blind end to distort said wall inwards to grip said shaft.

2. Sound reproducing apparatus according to claim 1, in which the inner end of the screw comprises a part spherical cup which fits closely against a part of the ball.

3. Sound reproducing apparatus according to claim 1 in which the ball is a hardened steel ball bearing.

4. Sound reproducing apparatus according to claim 1 in which the angle included between the axis of the bore and the axis of the shaft between its intersection with the axis of the bore and the free end of the shaft is acute.

5. Sound reproducing apparatus according to claim 1 in which the blind end of the bore is conical.

6. Sound reproducing apparatus according to claim 1 in which the diameter of the socket is less than .001 inch greater than that of the shaft.

References Cited in the file of this patent

UNITED STATES PATENTS

| | | |
|---|---|---|
| 2,272,852 | Schaefer | Feb. 10, 1942 |
| 2,300,913 | Flaherty | Nov. 3, 1942 |
| 2,817,244 | Obolensky | Dec. 24, 1957 |